Patented May 13, 1941

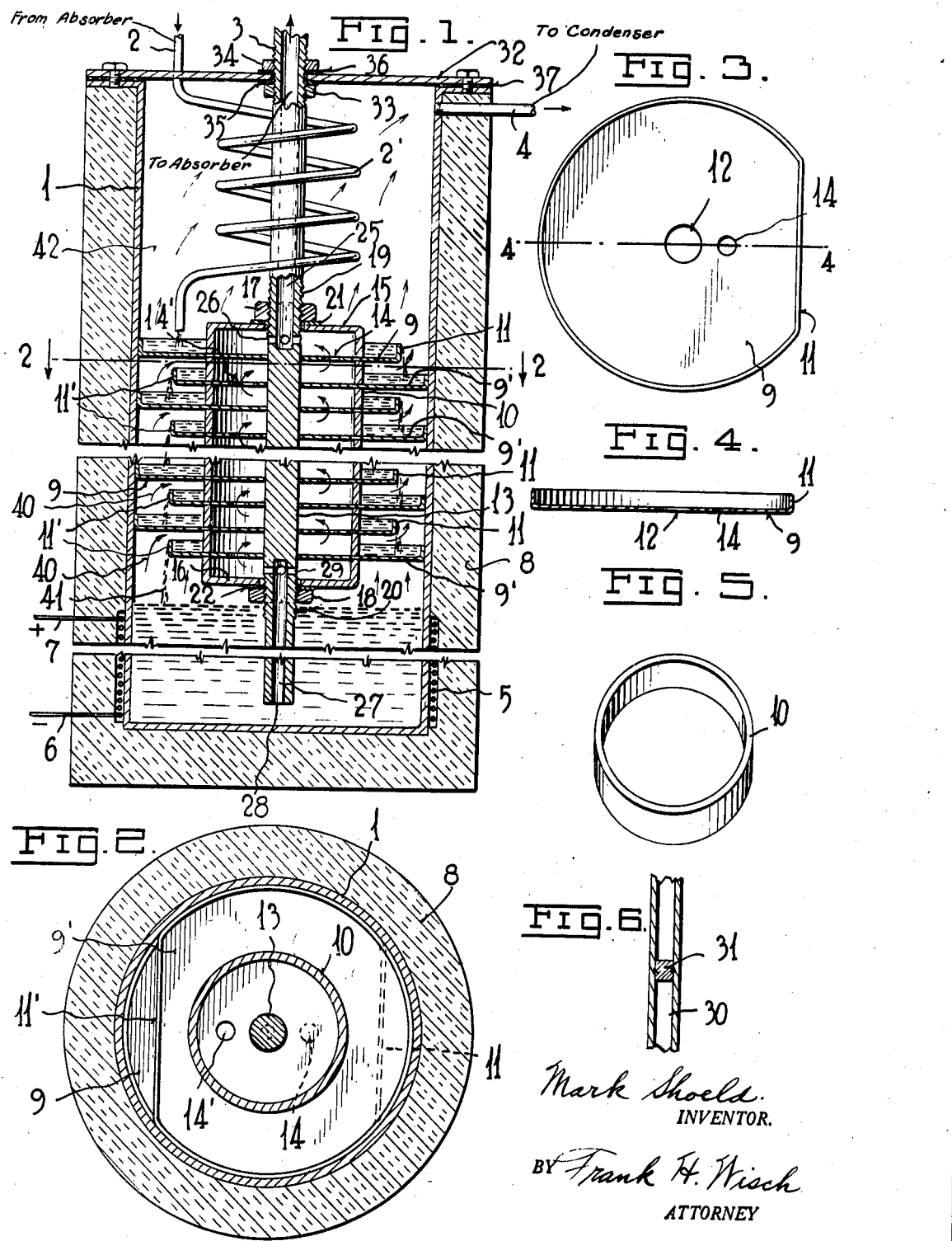

2,241,621

UNITED STATES PATENT OFFICE 2,241,621

METHOD OF AND MEANS FOR SEPARATING GASES FROM LIQUIDS

Mark Shoeld, Baltimore, Md.

Application July 31, 1937, Serial No. 156,792

13 Claims. (Cl. 62—119)

The present invention relates to improvements in means for treating liquids containing gases and to methods of treating such liquids. More particularly the invention relates to means for use in absorption refrigerating systems, whereby a given gas and a given liquid medium employed in an absorption system are treated in a highly efficient manner to bring about effective separation of gas and liquid for further use in the refrigeration cycle.

In the absorption refrigerating systems heretofore in use, heat exchangers have long been employed in which, for instance, hot weak ammonia solution in an aqueous medium and cold strong ammonia solution are brought into indirect heat exchange relation to each other. The cold strong solution from the absorber in such a system is run through the heat exchanger countercurrently to the hot weak solution from the generator. As the cold strong solution is heated up in the heat exchanger, a considerable amount of ammonia gas is evolved, but as there is no opportunity for this gas to escape in a conventional closed heat exchanger, this gas is not released until the mixture of liquid and gas or vapor is discharged therefrom. At the point of discharge the temperature of the evolved, moist ammonia gas is at the maximum temperature obtainable in its travel through the heat exchanger, which of course means that the water vapor pressure or rather the partial pressure of the water vapor in the ammonia gas is also at the corresponding maximum. The moist ammonia gas from the generator is combined with the moist gas from the heat exchanger and this mixture is conducted through a rectifier to dry the gas by means of fractionation through heat abstraction. Since it is necessary to furnish substantially dry ammonia gas to the condenser in the refrigeration system, the aforesaid heat abstraction although a loss to the system has been essential and unavoidable:.

An object of the present invention is to provide means for recovering and employing usefully the heat which, in apparatus of the type mentioned above is otherwise dissipated and lost in the rectifier.

A further object is to provide a simple, inexpensive and efficient apparatus in which is combined in a single unit the functions of a generator, a heat exchanger and a rectifier.

Another object is to provide improved means for and methods of treating liquids containing gases.

Still another object is to provide improvements in means particularly useful in domestic refrigerating machines of the absorption type.

The invention herein described comprises a chamber element in which is housed means for separating a gas from a liquid while passing the liquid to a heated zone in the chamber countercurrent to the separated gas and while passing the heated liquid in indirect heat exchange relation to and countercurrent to the liquid passing to the heated zone. More particularly the invention includes means which may be readily assembled to provide a unit having the combined functions of, and therefore adapted to replace, a generator, heat exchanger and rectifier in a refrigerating system.

In the accompanying drawing which illustrates the invention, the figures are as follows:

Figure 1 is a vertical cross-section of one form of apparatus for carrying out the process of the present invention;

Fig. 2 is a cross-sectional view of Fig. 1 on the line 2—2 in the direction of the arrows;

Fig. 3 is a plan view of a plate in the assembled unit shown in Fig. 1;

Fig. 4 is a cross-sectional view of a plate on line 4—4 of Fig. 3;

Fig. 5 is a perspective view of a wall element and spacing means for the plates shown assembled in Fig. 1;

Fig. 6 is a cross-section of a modified portion of the apparatus shown in Fig. 1.

Referring to Fig. 1, the apparatus shown comprises a container 1 which may be cylindrical and made of steel or other suitable metal; and elements associated therewith including inlet means 2 for liquid containing gas, outlet means 3 for liquid from which gas has been separated, and outlet means 4 for the separated gas. Heating means such as a coil 5 may be provided for heating a zone in the container 1 adjacent the bottom thereof. Lead wires 6 and 7 connect the coil 5 to a source of electric current. Heat insulation material 8 is provided on the outside of the wall and the bottom of the container 1.

Supported within the container 1 are means including a plurality of similarly constructed plates 9 and 9' alternately arranged as shown and and spaced apart by rings 10. The construction of the plates and rings when disassembled is illustrated in Figs. 3, 4 and 5. The plates are formed of stamped or pressed metal, such as sheet iron, to form a raised edge or flange 11, and are provided with a perforation 12 for the passage of a rod 13 therethrough for maintaining the plates in position. The plates are in the form of a segment of a circle having an area substantially greater than one-half the area of the circle, or in other words substantially greater than one-half the area of a horizontal cross section of the chamber formed by the container. When a plate is in position in the container 1, the circular edge thereof fits snugly against the side wall of the container. The straight edge 11 (Fig. 3) on the plate 9 will of course be spaced from the wall of the container 1. A perforation 14 is provided in the plates 9 adjacent the straight edge 11, or between the perforation 12 and the straight edge 11.

When the plates are assembled as shown in Fig. 1, the top plate 9 and every other plate 9 below it are positioned with straight edges 11 and perforations 14 in alignment nearer one side of the container 1; and the second plate 9' and every other plate 9' therebelow are positioned with straight edges 11' and perforations 14' in alignment nearer the opposite side of the container.

Although the above-described plate is a preferred form, other forms may be used which function in substantially the same manner. If the horizontal cross-section of the chamber formed by the container 1 is rectangular, instead of circular, the plates may be rectangular. The shape of the plate depends on the shape of the wall of the chamber. At least a major portion of the edge of a plate is shaped to abut unattachedly the inner wall of the container 1.

In assembling the plates and rings, after arranging or adjusting them on the rod 13 as shown, they are clamped together by means of cups 15 and 16 and nuts 17 and 18. The rod 13 passes through a perforation in each of the cups, and the latter are of the same diameter as the rings so that the edges of the cups are in alignment with the rings. The rod 13 is screw-threaded at 19 and 20 to receive the nuts 17 and 18 respectively, provided with gaskets 21 and 22 if desired. The nuts are screwed tightly toward each other and thus an inner chamber is formed by the rings 10 and the cups 15 and 16, which chamber is divided into a plurality of compartments by the plates 9 and 9'. The perforations 14 in plates 9 are substantially in alignment on one side of the inner chamber, and perforations 14' in plates 9' are substantially in alignment on the opposite side of the inner chamber.

The rod 13 is provided with a drilled passage at each end. The passage 25 in the upper end of the rod 13 and embodying the outlet means 3, is connected by drill holes 26 to the uppermost compartment in the inner chamber under the cup 15. The passage 27 in the lower end of the rod 13 extends from the open end 28 adjacent the bottom of the container 1 to the lowermost compartment above the cup 16 and is connected to this compartment by drill holes 29.

In place of the rod 13 a tube 30 (Fig. 6) may be employed having a plug 31 therein that prevents direct flow of liquid therethrough.

The rod 13 passes through an opening of the cover plate 32 for the container 1. The nuts 33 and 34 in screw-threaded relation to the rod, may be employed to fasten the rod to the cover. Gaskets 35 and 36 for the nuts may be provided to prevent leakage. Likewise a gasket 37 for the cover may be provided, and the cover 32 may be screwed or otherwise fastened to the container 1 to seal the same.

In the operation of the above described apparatus in a refrigeration system, for instance, (features of which are well known and need not be described here) the inlet 2 is connected to a pump that pumps cold ammonia solution from the absorber provided in the system. The solution from the absorber passes into the container 1 and onto the top plate 9. The plates 9 and 9' fill up with liquid which overflows and passes over the edge 11 and 11' of each plate 9 and 9' respectively, onto each plate in succession. The liquid takes its circuitous path down to the zone at the bottom of the container 1 heated by the coil 5. This zone is kept full preferably to a level somewhat above the upper strand of the coil 5.

The liquid in the bottom of the container 1 is drawn upwardly through the passage 27, holes 29, and successively through the compartments in the inner chamber formed by the rings 10, and thence through the holes 26 and the passage 25 through the outlet 3 which is connected to the inlet of the absorber in the refrigerating system.

The hot liquid from the bottom of the container 1 completely fills the inner chamber formed by the rings 10 which may be made of any suitable metal, such as steel, for transmitting heat. While the liquid passes in a zigzag path upwardly through the compartments in the inner chamber, heat is transmitted to the liquid passing in a generally zigzag path downwardly through the container 1 outside the inner chamber. The cold liquid entering through the inlet 2 is therefore progressively heated on its way to the bottom of the container 1 while the heated liquid is progressively cooled on its way to the outlet 3. At the same time, gas contained in the entering cold liquid is released as the liquid passes downwardly outside the inner chamber and as it is heated in the bottom of the container. The released gas travels in the general direction indicated by the arrows 40 and flows countercurrent to the liquid 41 outside the inner chamber. The gas passing upwardly through the container 1 contacts the incoming liquid and passes through it as the liquid falls from one plate to the next. The gas practically free from water vapor finally passes out of the container 1 through the outlet 4 which may be connected to the condenser in a refrigerating system.

The plates as arranged outside the inner chamber formed by the rings 10 function in the manner of a dephlegmator or a fractionating column. Strong cold ammonia solution entering the system, may, for instance, be of a concentration of 30% ammonia, whereas the actual concentration of the ammonia on the top plate may be far greater due to the dephlegmating effect of the plates 9 and 9'. The wet ammonia gas in its travel up through the container 1 is therefore thoroughly dephlegmated and dried by the descending cold strong ammonia solution.

A coil 2', which may be optional, is provided as a part of the inlet means 2 for the cold strong gas solution, and is positioned in the space 42 above the plates. The coil 2' serves as a means for finally indirectly cooling and dehydrating the gas before it leaves the container through the outlet 4. The coil 2' may be considered a safety arrangement to insure at all times the supply of dry gas to the condenser.

In further explanation of the operation of the apparatus, it is noted that the volume and heat-capacity of the liquid-and-gas-composition entering the container 1 at a relatively low temperature and having a high concentration of the gas, are considerably greater than the volume and heat-capacity of the heated liquid passing from the bottom of the container 1 through the inner chamber formed by the rings 10 and discharging through the outlet 3. The difference is of course in the gas that ascends the container. The heat-capacity of ammonia gas is, however, only about one-half of that of ammonia dissolved in water. Moreover, the latent heat carried in the ammona gas from the system and subsequently rejected in the condenser is the major portion of the heat input to the system. Furthermore, as the liquid entering the container 1 descends to the bottom, ammonia gas is released which will absorb heat and make the cooling effect of the descending liquid more efficient.

The baffling of the path of the weak ascending liquid does not only increase the heat transfer area available but also increases the linear velocity of flow, thereby increasing the heat transfer coefficient.

The unit described may be of any suitable dimensions. When used in a domestic refrigerator, the container 1 can be constructed from a 1½-inch to a 2-inch steel pipe, three to four feet in length. The number of plates in a unit may vary for instance from about 40 to 50, or more or less. Although the plates are shown in a preferred form they may vary in structure. The form shown is particularly suited for small units since they can be readily and easily assembled. The straight edge makes it possible to place a plate conveniently in the desired position. Although only one perforation 14 is shown in a plate, more than one may be provided. Also, the edge 11 may be any height preferably to form a pool of liquid.

Reference is made to my Patent No. 2,238,080 dated April 15, 1941, in which there is shown and described a refrigeration unit equipped with the apparatus claimed herein.

I claim:

1. In ammonia absorption refrigeration systems, apparatus comprising spaced inner and outer chambers, the said inner chamber having a heat-conducting wall, means for directing concentrated ammonia solution in a zigzag path downwardly in the outer chamber and for directing ammonia gas separated from the solution countercurrent to the said solution, means for conducting the resulting weakened ammonia solution from adjacent the bottom of the said outer chamber into the lower portion of the said inner chamber, means for directing the said weakened ammonia solution from the outer chamber in a zigzag path upwardly through the said inner chamber, and means for heating ammonia solution in the lower portion of the said outer chamber.

2. In ammonia absorption refrigeration systems, apparatus comprising an inner chamber having a plurality of spaced, horizontal, superposed plates each having an opening, openings thus provided being positioned alternately adjacent substantially opposite sides of the said inner chamber, an outer chamber encasing the said inner chamber, each of the said plates extending into the outer chamber, and each of the said plates, in the said outer chamber, having a portion of its edge spaced from the wall of the said outer chamber, spaces thus provided being positioned alternately at substantially opposite sides of the said outer chamber; passage means connecting the lower portion of the inner chamber with the lower portion of the outer chamber, an outlet passage means in the upper portion of each chamber, inlet passage means in the upper portion of the outer chamber, and means for heating the lower portion of the said outer chamber.

3. In ammonia absorption refrigerating systems, apparatus comprising a chamber having means therein for separating ammonia from liquid, the said means including a plurality of ring members and a plurality of perforated plate members of larger diameter than the said ring members, the said ring members and plate members being alternately arranged and the said ring members being in alignment, and means for clamping the ring members and plate members rigidly together, thereby providing for passage of liquid through ring members and around the periphery of the ring members between the said plates, and passage means connecting the space outside the said ring members and the space within the said ring members.

4. In ammonia absorption refrigeration systems, apparatus comprising a chamber having means therein for separating ammonia from liquid, the said means including a plurality of ring members constructed of heat-conducting material and a plurality of plate members of larger diameter than the said ring members, the said ring members and plate members being alternately arranged and the said ring members being in alignment and means for clamping the ring members and plate members rigidly together, the said plate members being positioned and constructed to permit flow of liquid circuitously through ring members and a separate stream of liquid circuitously outside the ring members from adjacent one end of the said chamber toward the other, and passage means connecting the space outside the said ring members and the space within the said ring members.

5. In apparatus for a refrigeration system, a chamber element having removable means for separating gas from liquid employed in the said system, the said means including a plurality of plates for dephlegmating the liquid containing gas, and ring elements spacing apart the said plates, the said ring elements forming a passage for liquid passed from the chamber in heat exchange relation to the liquid being dephlegmated, and means providing a passage for the liquid from the said chamber into the said first-named passage.

6. In apparatus for ammonia absorption refrigeration systems, a chamber element having means for conducting liquid containing ammonia downwardly through the chamber and ammonia separated from the liquid upwardly through the chamber, heating means for heating a zone in the chamber accessible to the said liquid and means within the said chamber for conducting heated liquid through the full length thereof from the heating zone upwardly in indirect heat exchange relation to the liquid and the ammonia.

7. In ammonia absorption refrigerating apparatus, a unit comprising a chamber with heating means for heating a zone in the said chamber, inlet means for introducing cold strong ammonia liquor into the said chamber, rectifier means within the said chamber for separating substantially anhydrous ammonia gas from said ammonia liquor, outlet means for removing the separated ammonia gas from the said chamber, the said rectifier means permitting the flow of said ammonia liquor therethrough from the said inlet means to the said zone and simultaneously permitting the flow of ammonia gas therethrough in contact with the ammonia liquor to said outlet means and passage means extending through the rectifier means and substantially through the length of the chamber for passing weak ammonia liquor out of the said zone and in heat exchange relation to the strong ammonia liquor in said rectifier means.

8. In ammonia absorption refrigerating apparatus, a container having a passage extending centrally therein from a relatively short distance from a closed end thereof through an outlet for liquid at the opposite end, the said passage being enlarged in cross section a portion of its length and having means within the said portion for directing liquid in a zigzag path therethrough toward the said outlet, means surrounding the said enlarged portion of the said passage for directing liquid in a zigzag path toward the said closed end of the said container and for directing gaseous matter in a zigzag path from the said closed end of the said container to an outlet for gaseous matter adjacent the said opposite end, and means for heating liquid in the said closed end of the container.

9. A method comprising passing cold concentrated ammonia solution from an absorber in a refrigerator system through a dephlegmating zone in a chamber and to a heating zone therein, heating the said solution to separate ammonia therefrom, passing the heated solution without substantial separation of vapors through the full length of the dephlegmating zone in indirect heat exchange relation to the cold solution passing to the heating zone and entirely within the said chamber whereby the cold solution is progressively heated and the heated solution is progressively cooled, and while conducting ammonia solution to the heating zone passing ammonia separating therefrom in direct contact with the solution thus conducted and countercurrent thereto.

10. In apparatus for ammonia absorption refrigerator systems, a unit comprising a single container having entirely within its walls, an ammonia generator means for heating strong ammonia solution, ammonia rectifier means accessible to ammonia vapors from the generator means, and a passage, entirely within the walls of the container, for conducting weak ammonia solution from the generator means through the length of the rectifier means and in indirect heat exchange relation thereto.

11. In apparatus for ammonia absorption refrigeration systems, a unit comprising a single chamber having entirely within its walls, means for heating strong ammonia solution while freely generating ammonia therefrom, passage means, entirely within the walls of the chamber, inaccessible to said ammonia for conducting heated weak ammonia solution the full length of the chamber and into indirect heat exchange relation with fresh solution containing ammonia to be generated, and means for separately collecting the generated ammonia.

12. In a container having combined heat exchanger and rectifier means, a pressed metal plate having at least a major portion of its edge shaped to fit and abut unattachedly and adjustably the wall of the container, the said plate having a perforation for the passage of means therethrough for maintaining the plate in position in the said container, and having a flange at the remaining portion of its edge for the passage of a stream of liquid thereover, and a perforation adjacent the said first-named perforation for the passage of a separate stream of liquid therethrough.

13. In apparatus for an ammonia absorption refrigeration system, a chamber element having removable means for separating ammonia from liquid employed in the said system, the said means including dephlegmating means in which separated ammonia and liquid pass countercurrently to each other, tubular means for withdrawing liquid from the chamber; and auxiliary coil means leading to the top of the dephlegmating means within the chamber element and encircling the said tubular means in a zone where the liquid in said tubular means leaves the chamber, for introducing cold ammonia solution into the chamber and for cooling the separated ammonia to remove vapors of the liquid therefrom before passing the ammonia out of the chamber to be used in the refrigeration system.

MARK SHOELD.